United States Patent
Huang et al.

(10) Patent No.: US 9,041,256 B2
(45) Date of Patent: May 26, 2015

(54) POWER CONTROL DEVICE USING STATUS LATCH MODULE AND ELECTRONIC DEVICE USING THE SAME

(75) Inventors: Wei-Chiao Huang, New Taipei (TW);
Li-Cheng Yeh, New Taipei (TW);
Yung-Yu Huang, New Taipei (TW);
Wei-Chih Lai, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 619 days.

(21) Appl. No.: 13/420,627

(22) Filed: Mar. 15, 2012

(65) Prior Publication Data
US 2012/0267965 A1    Oct. 25, 2012

(30) Foreign Application Priority Data
Apr. 25, 2011    (TW) .............................. 100114259 A (51) Int. Cl.
*H03K 17/94*    (2006.01)
*H02J 9/00*    (2006.01)

(52) U.S. Cl.
CPC ...................................... *H02J 9/005* (2013.01)

(58) Field of Classification Search
None
See application file for complete search history.

(56) References Cited

U.S. PATENT DOCUMENTS

| | | | |
|---|---|---|---|
| 5,642,104 A | 6/1997 | Erwin | |
| 7,315,097 B2 * | 1/2008 | Tajika | ............................ 307/131 |
| 8,497,604 B2 * | 7/2013 | Seo et al. | ........................ 307/116 |
| 8,736,116 B2 * | 5/2014 | Yoshie | ........................... 307/125 |
| 2005/0231870 A1 | 10/2005 | Tajika | |
| 2006/0271800 A1 * | 11/2006 | Li et al. | ........................... 713/300 |
| 2007/0214373 A1 | 9/2007 | Chen | |

FOREIGN PATENT DOCUMENTS

| | | |
|---|---|---|
| CN | 1869877 A | 11/2006 |
| TW | 200607232 | 2/2006 |

OTHER PUBLICATIONS

Office action mailed on Jan. 9, 2014 for the Taiwan application No. 100114259, filing date: Apr. 25, 2011, p. 1 line 13-14, p. 2 and p. 3 line 1-25.
Office action mailed on Jan. 15, 2014 for the China application No. 201110126858.9, p. 3 line 4-30, p. 4 and p. 5 line 1.
Office action mailed on Sep. 30, 2014 for the Taiwan application No. 100114259, filing date: Apr. 25, 2011, p. 2 line 7-26, p. 3 and p. 4 line 1-23.

* cited by examiner

*Primary Examiner* — Rexford Barnie
*Assistant Examiner* — David Shiao
(74) *Attorney, Agent, or Firm* — Winston Hsu; Scott Margo (57) ABSTRACT

A power control device for an electronic device includes a power switching unit for switching to output a dc power source to a load of the electronic device according to a power switching signal, a switching detection unit for responding a power switching status to generate a switching detection signal, a status latch module for generating the power switching signal according to the switching detection signal, a first status signal and a second status signal, and a logic unit for generating the first status signal and the second status signal for the status latch module according to the power switching signal, such that the status latch module latches the first status signal and the second status signal.

24 Claims, 8 Drawing Sheets

POWER CONTROL DEVICE USING STATUS LATCH MODULE AND ELECTRONIC DEVICE USING THE SAME

BACKGROUND OF THE INVENTION

1. Field of the Invention

The invention relates to a power control device and an electronic device, and more particularly, to a power control device capable of effectively reducing standby power consumption and an electronic device using the same.

2. Description of the Prior Art

An electronic product usually has a power switch for switching on or off operations. However, when switched off, the electronic product still consumes a certain amount of standby power. With energy conservation requirements and related regulations growing more stringent, a demand for lower standby power has been imposed on all electronic products. A common method is to add an extra power switch, at the expense of increased costs and difficulties for product design. Another method is utilizing a microcontroller to control a power supply status of the electronic product. In other words, pressing a power switch button does not directly control a power supply to the electronic product; instead, a command is first outputted to the microcontroller, for the microcontroller to control the power supply status. In such a case, when switched off, the electronic product still consumes a certain standby power for the microcontroller, such that the microcontroller may correctly detect a power-on command from a user.

Therefore, how to further reduce standby power consumption of electronic products to conform to related energy conserving requirements and regulations has become a common goal for the industry.

SUMMARY OF THE INVENTION

Therefore, the primary objective of the invention is to provide a power control device and an electronic device.

An embodiment of the invention discloses a power control device for an electronic device, comprising a power switching unit, for switching to output a direct current power source to a load of the electronic device according to a power switching signal; a switching detection unit, for responding a power switching status to generate a switching detection signal; a status latch module, for generating the power switching signal according to the switching detection signal, a first status signal and a second status signal; and a logic unit, for generating the first status signal and the second status signal for the status latch module according to the power switching signal, such that the status latch module latches the first status signal and the second status signal.

Another embodiment of the invention further discloses an electronic device, comprising a load; a power supply, for outputting a direct current power source; and a power control device, comprising a power switching unit, for switching to output the DC power source to the load according to a power switching signal; a switching detection unit, for responding a power switching status to generate a switching detection signal; a status latch module, for generating the power switching signal according to the switching detection signal, a first status signal and a second status signal; and a logic unit, for generating the first status signal and the second status signal for the status latch module according to the power switching signal, such that the status latch module latches the first status signal and the second status signal.

These and other objectives of the invention will no doubt become obvious to those of ordinary skill in the art after reading the following detailed description of the preferred embodiment that is illustrated in the various figures and drawings.

DETAILED DESCRIPTION

Figure 1:
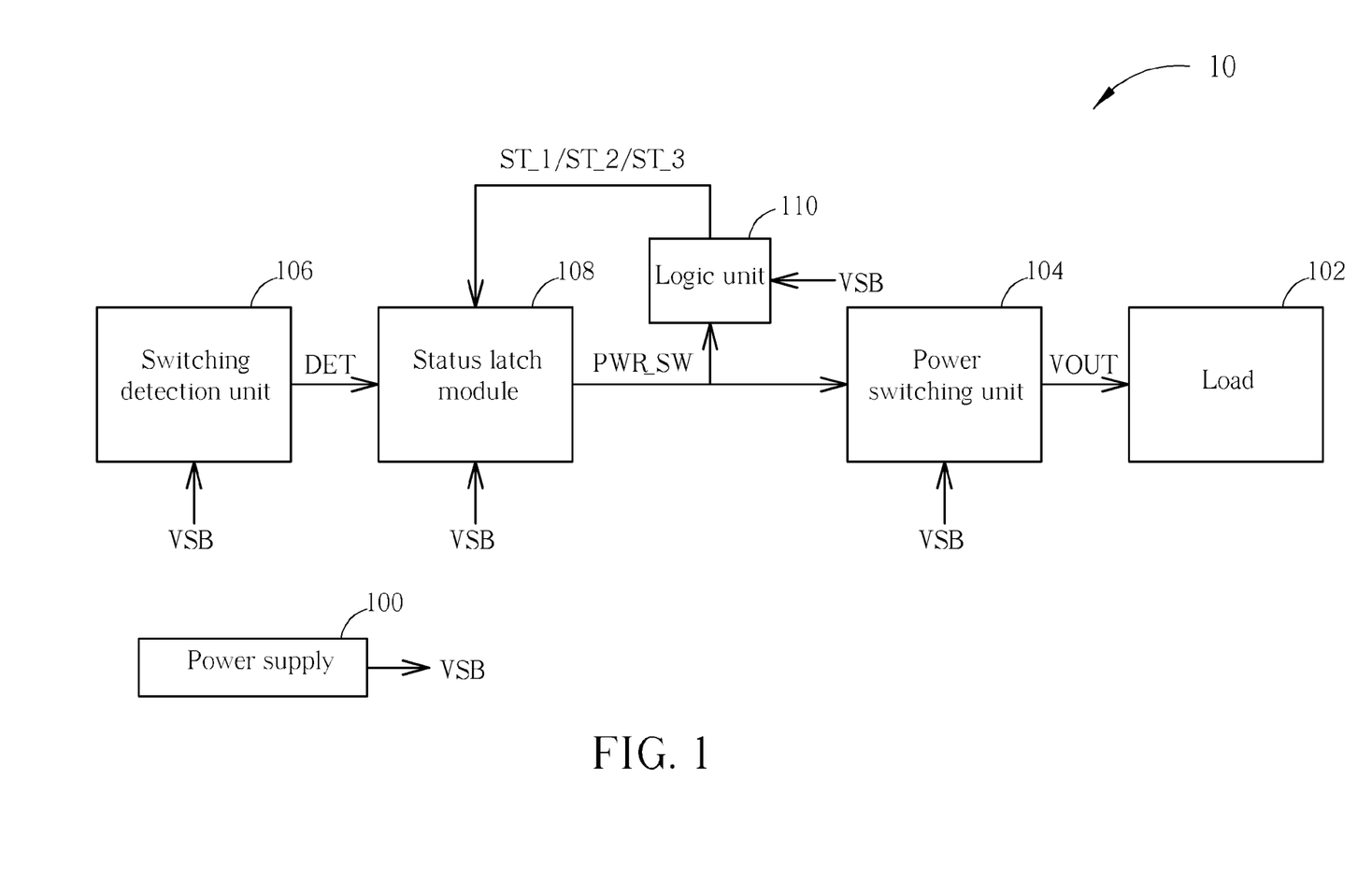
FIG. 1 is a schematic diagram of a power control device according to an embodiment of the invention.

Please refer to FIG. 1, which is a schematic diagram of a power control device 10 according to an embodiment of the invention. The power control device 10 can be used in various electronic devices, for receiving a direct current (DC) power source VSB outputted by a power supply 100, and can be controlled by a user to output a DC power VOUT to a load 102 of the electronic device. The power control device 10 includes a power switching unit 104, a switching detection unit 106, a status latch module 108 and a logic unit 110. The switching detection unit 106 is utilized for responding a power switching status of the user, and generating a switching detection signal DET for the status latch module 108 accordingly. The status latch module 108 outputs a power switching signal PWR_SW to the logic unit 110 and the power switching unit 104 according to the switching detection signal DET. The logic unit 110 generates status signals ST_1, ST_2, ST_3 for the status latch module 108 according to the power switching signal PWR_SW, such that the status latch module 108 latches a present power switching status. The power switching unit 104 decides whether the DC power VOUT is outputted to the load 102 according to the power switching signal PWR_SW.

In short, the power control device 10 utilizes the status latch module 108 to temporarily store an on/off status corresponding to the power supply, and thus does not need a microcontroller for power control. In such a case, a standby power consumption of the power control device 10 may be effectively reduced when the device is turned off. Please refer to FIGS. 2 to 5 for implementations of the switching detection unit 106, the status latch module 108, the logic unit 110 and the power switching unit 104.

Figure 2:
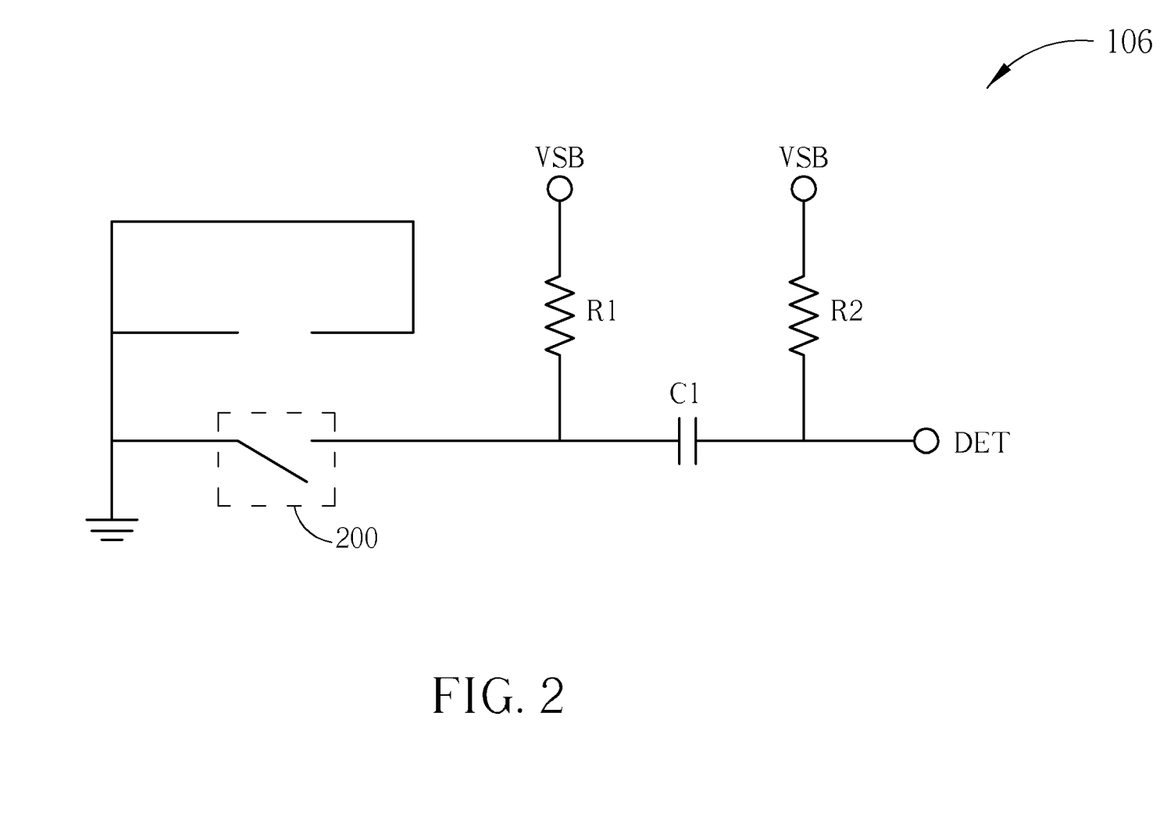
FIG. 2 is a schematic diagram of an embodiment of a switching detection unit shown in FIG. 1.

FIG. 2 is a schematic diagram of an embodiment of the switching detection unit 106. As shown in FIG. 2, the switching detection unit 106 is composed of a switch 200, resistors R1, R2 and a capacitor C1. When not pressed, the switch 200 remains in an open status, such that the switching detection signal DET is maintained at a high level; when pressed, the switch 200 conducts a path to a ground, such that the switching detection signal DET is pulled to a low level. The resistors R1, R2 and the capacitor C1 are combinedly utilized to provide delay and filtering functionalities, to eliminate effects of noise signals and other interruptions on the switching detection signal DET.

Figure 3:
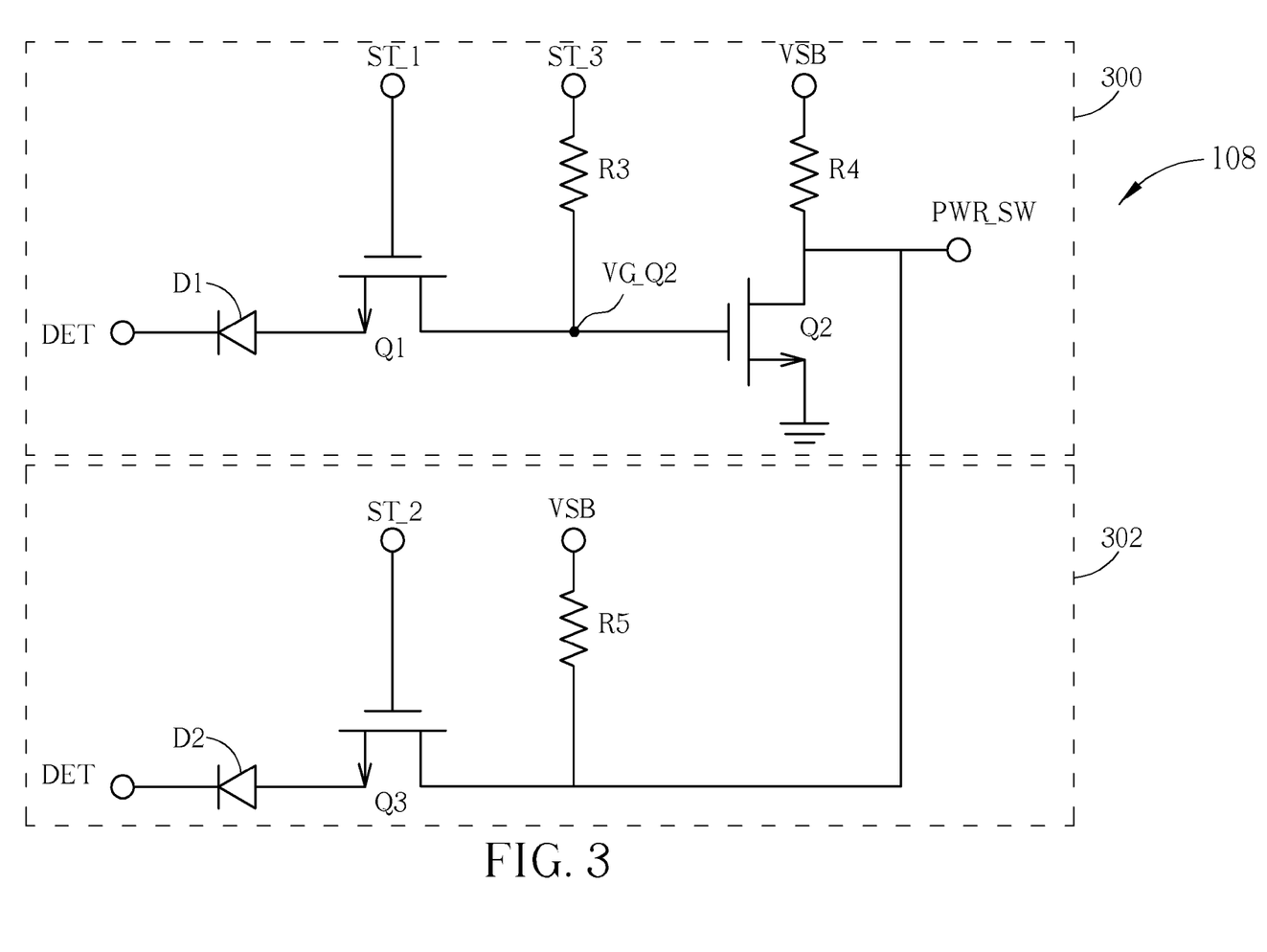
FIG. 3 is a schematic diagram of an embodiment of a status latch module shown in FIG. 1.

FIG. 3 is a schematic diagram of an embodiment of the status latch module 108. As shown in FIG. 3, the status latch module 108 includes a first status latch unit 300 and a second status latch unit 302, for receiving status signals ST_1, ST_2, ST_3 at different signal receiving ends, and for latching the status signals ST_1, ST_2, ST_3. In more detail, the first status latch unit 300 is composed of a diode D1, transistors Q1, Q2 and resistors R3, R4. The second status latch unit 302 is composed of a diode D2, a transistor Q3 and a resistor R5. Drains of the transistors Q2 and Q3 are for generating the power switching signal PWR_SW for the logic unit 110 and the power switching unit 104. Moreover, the status signals ST_1, ST_2, and ST_3 are provided by the logic unit 110. Generation methods and timing relationships of the status signals ST_1, ST_2, and ST_3 will be further described. Here, it suffices to note that the status signals ST_1 and ST_3 are same-direction signals, whereas the status signal ST_2 is inverse to the status signals ST_1 and ST_3. Additionally, a generation time of the status signal ST_2 is later than that of the status signal ST_1; the generation time of the status signal ST_1 is later than that of the status signal ST_3, and the generation time of the status signal ST_3 is obviously later than that of the power switching signal PWR_SW. Note that, definitions of "same-direction" or "inverse" signals are relative to a predefined signal range. In other words, assuming the status signals ST_1, ST_2, and ST_3 are voltage signals ranging between 0 to 12 volts, then the status signals ST_1 and ST_3 are said to be same-direction if the status signals ST_1 and ST_3 are both equal to (or approximate) 0 or 12 volts; the status signal ST_2 is said to be inverse to the status signal ST_1 if the status signal ST_1 equals (or approximates) 0 volt while the status signal ST_2 equals to (or approximates) 12 volts, and vice versa.

Since the status signals ST_1 and ST_3 are same-direction signals, and the status signal ST_2 is inverse to the status signals ST_1 and ST_3, it may be known that during a steady state (i.e. the status signals ST_1, ST_2, ST_3 are unchanging), only one of the transistors Q1 and Q3 would be in operation (having a high level gate voltage). In other words, when changes occur in the switching detection signal DET, only one of the first status latch unit 300 and the second status latch unit 302 would be in operation to change a level of the power switching signal PWR_SW.

For example, when the status signals ST_1 and ST_3 are at high levels (and thus the status signal ST_2 is relatively at a low level), and when the user does not press the switch 200 shown in FIG. 2, a gate voltage VG_Q2 of the transistor Q2 would be kept at a high level, thereby conducting the transistor Q2. Thus, a drain voltage of the transistor Q2 (i.e. the power switching signal PWR_SW) would be kept at a low level (i.e. a conducting voltage from the drain to a source of the transistor Q2). It follows that, since the status signal ST_2 is at a low level, the transistor Q3 is cut off. Next, if the user presses the switch 200 shown in FIG. 2, the switching detection signal DET drops to the ground signal, and since the transistor Q1 is conducting, the diode D1 also conducts due to a forward bias, and the gate of the transistor Q2 is conducted to the ground via the transistor Q1, the diode D1, the capacitor C1, and the switch 200, such that the gate voltage VG_Q2 decreases to the low level, causing the transistor Q2 to cut off. In other words, the power switching signal PWR_SW changes from the low level to the high level. Subsequently, the logic unit 110 converts the status signals ST_1, ST_3 to low levels, and converts the status signal ST_2 to high-level according to the high-level power switching signal PWR_SW, thereby causing the transistors Q1, Q2 to cut off and the transistor Q3 to conduct. This will be described in further detail.

Following the above, when the status signal ST_2 is at high level (and thus the status signals ST_1 and ST_3 are relatively at low levels), the transistor Q3 remains conducted, and the transistors Q1, Q2 remain cut off. If the user does not press the switch 200 shown in FIG. 2, then the switching detection signal DET is kept at high-level, such that the diode D2 is cut off. In other words, the power switching signal PWR_SW is kept at high level. Next, if the user presses the switch 200 shown in FIG. 2 to reduce the switching detection signal DET to the ground signal, then the diode D2 would enter forward bias and conduct. Since the transistor Q3 is conducting, a drain voltage of the transistor Q3 (i.e. the power switching signal PWR_SW) changes from high-level to low-level. Subsequently, the logic unit 110 would convert the status signals ST_1, ST_3 to high levels, and convert the status signal ST_2 to low level according to the low-level power switching signal PWR_SW, thereby conducting the transistors Q1, Q2 and cutting off the transistor Q3. This will also be described in further detail.

Figure 4:
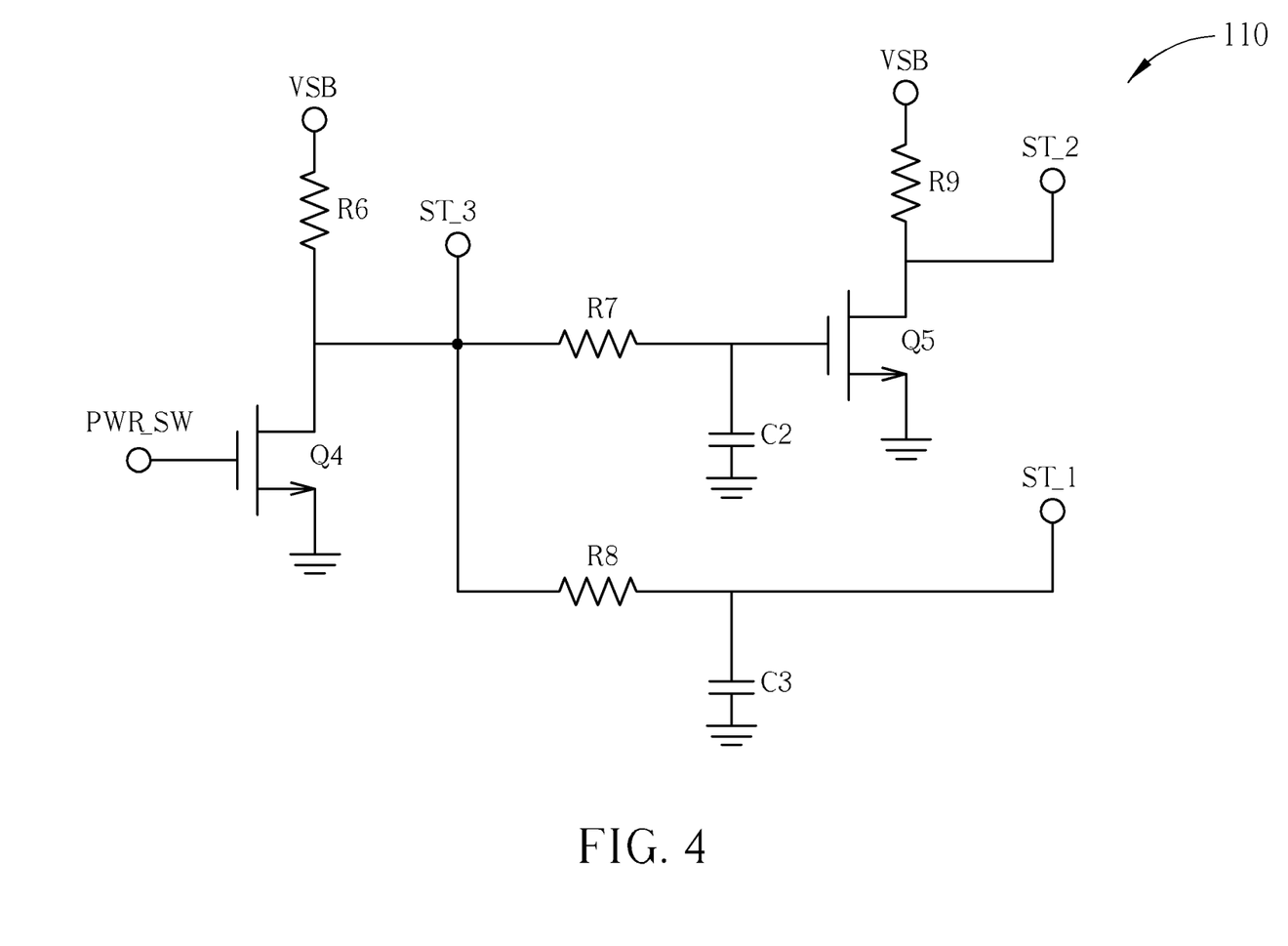
FIG. 4 is a schematic diagram of an embodiment of a logic unit shown in FIG. 1.

Next, please refer to FIG. 4, which is a schematic diagram of an embodiment of the logic unit 110. The logic unit 110 is composed of transistors Q4, Q5, resistors R6, R7, R8, R9, and capacitors C2, C3. Both of the transistors Q4, Q5 are used as inverting units, each for inverting a gate signal and outputting the inverted gate signal at a source. The resistor R7 and the capacitor C2, as well as the resistor R8 and the capacitor C3, are both combinedly utilized as delay units, each for producing a predefined delay in a signal, wherein a delay time produced by the former is longer than that produced by the latter. In more detail, when the power switching signal PWR_SW is at high-level, the transistor Q4 conducts, and a drain voltage of the transistor Q4 (i.e. the status signal ST_3) is at low-level, whereas the transistor Q5 cuts off, and a drain voltage of the transistor Q5 is at high-level. Conversely, when the power switching signal PWR_SW is at low-level, the transistor Q4 cuts off, and the drain voltage of the transistor Q4 is at high-level, whereas the transistor Q5 conducts, and the drain voltage of the transistor Q5 is at low-level. Together with the delay units formed by the resistor R7, the capacitor C2 and the resistor R8, the capacitor C3, it can be known that when the power switching signal PWR_SW changes from low-level to high-level, first, the status signal ST_3 would change from high-level to low-level; next, the status signal ST_1 changes from high-level to low-level; finally, the status signal ST_2 changes from low-level to high-level. Similarly, when the power switching signal PWR_SW changes from high-level to low-level, first, the status signal ST_3 would change from low-level to high-level; next, the status signal ST_1 changes from low-level to high-level; finally, the status signal ST_2 changes from high-level to low-level.

Therefore, together with the status latch module 108 shown in FIG. 3, it can be known that when the user switches the power supply, a change in level would first occur in the power switching signal PWR_SW, sequentially followed by level changes in the status signals ST_3, ST_1, and ST_2. Additionally, before the user subsequently switches the switching power supply again, the status latch module 108 would latch (maintain) the status signals ST_1, ST_2, and ST_3 at their original levels.

Figure 5:
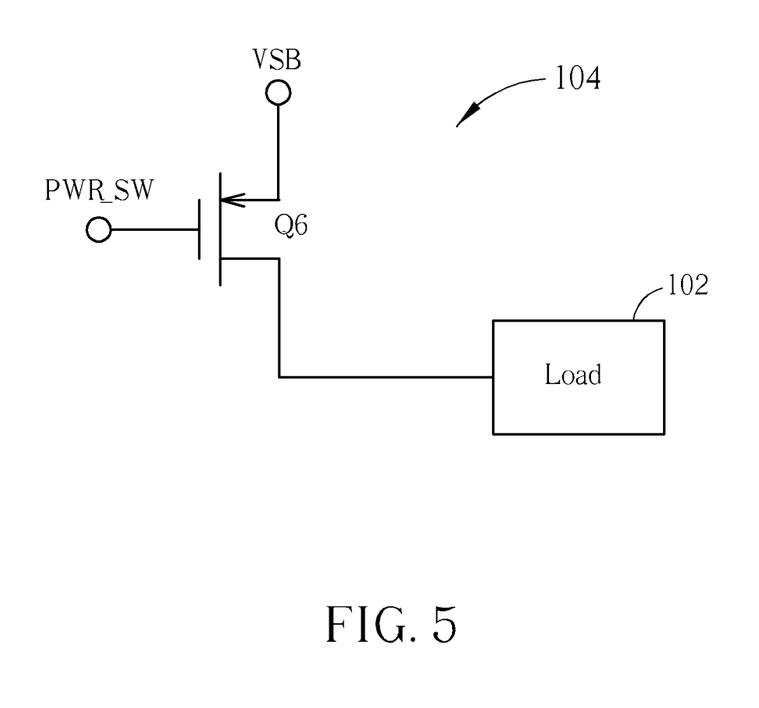
FIG. 5 is a schematic diagram of an embodiment of a power switching unit shown in FIG. 1.

Please continue to refer to FIG. 5, which is a schematic diagram of an embodiment of the power switching unit 104.

In this embodiment, the power switching unit 104 is implemented with a p-type metal oxide semiconductor (PMOS) transistor Q6.

Figure 6A:
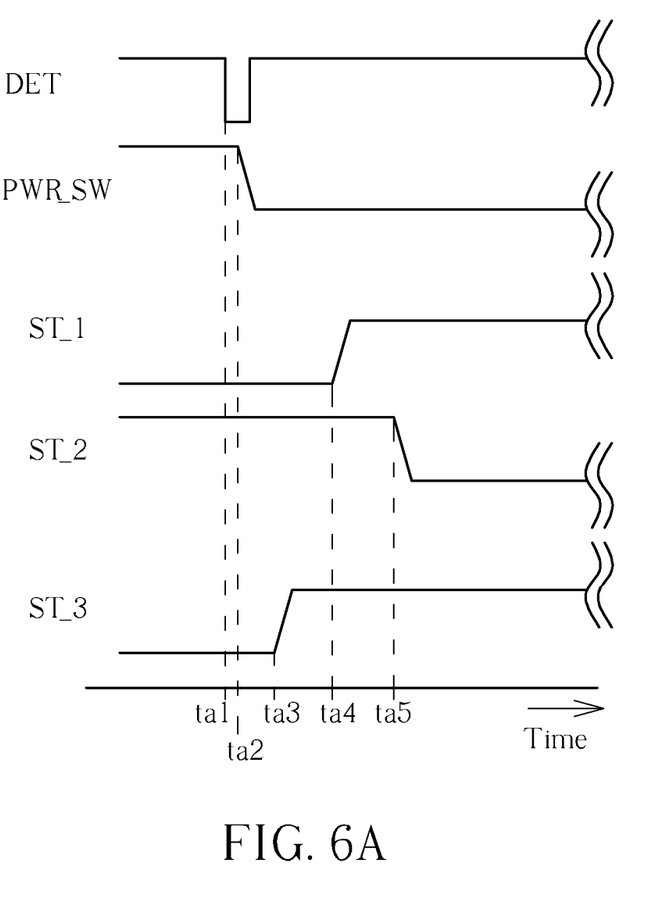
FIGS. 6A and 6B are signal waveform diagrams of the power control device shown in FIG. 1.
Figure 6B:
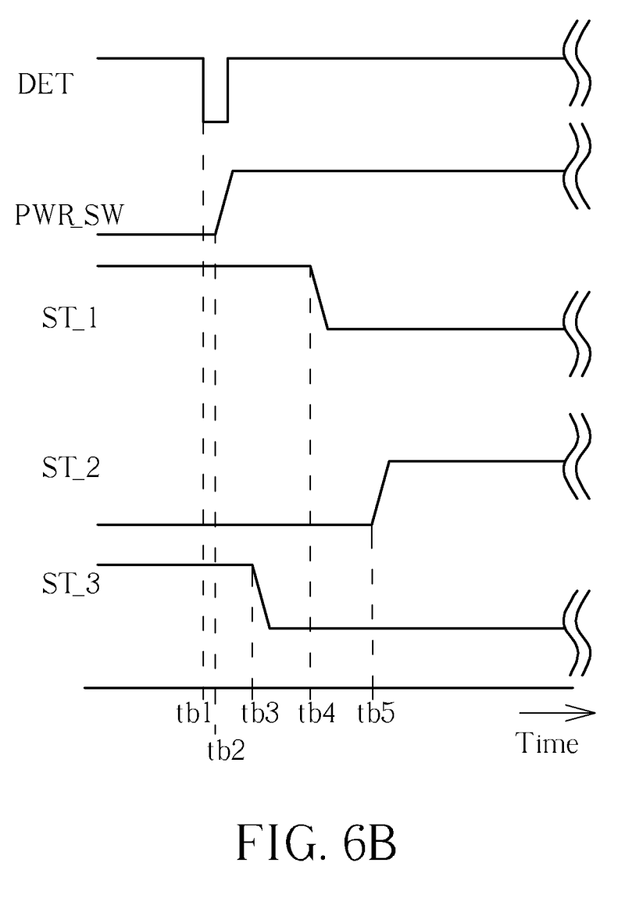

Therefore, operations of the power control device 10 may be summarized into signal waveform diagrams as shown in FIGS. 6A and 6B. FIG. 6A represents signal waveforms when the power control device 10 is switched from off to on, and FIG. 6B represents signal waveforms when the power control device 10 is switched from on to off. Firstly, as shown in FIG. 6A, when the power control device 10 is in an off-state (i.e. prior to a time point ta1), the switching detection signal DET, the power switching signal PWR_SW and the status signal ST_2 are at high levels, and the status signals ST_1 and ST_3 are at low levels. Therefore, the transistor Q3 conducts, and the transistors Q1, Q2 are cut off. Next, at the time point ta1, the user presses the switch 200, causing the detection signal DET to decrease to the ground signal, and the power switching signal PWR_SW to change from high-level to low-level at a time point ta2. Due to a delay effect of the logic unit 110, the status signal ST_3 changes from low-level to high-level at a time point ta3; the status signal ST_1 changes from low-level to high-level at a time point ta4; finally, the status signal ST_2 changes from high-level to low-level at a time point ta5. Together with the status latch module 108 shown in FIG. 3, it may be known that when the power control device 10 switches from off to on, only the second status latch unit 302 is in operation at the beginning. From the time points ta3 to ta5, however, operation gradually switches to the first status latch unit 300 only.

Similarly, as shown in FIG. 6B, when the power control device 10 is in an on-state (i.e. prior to a time point tb1), the switching detection signal DET, the status signal ST_1 and the status signal ST_3 are at high levels, and the power switching signal PWR_SW and the status signal ST_2 are at low levels. Therefore, the transistor Q3 is cut off, and the transistors Q1, Q2 are conducted. Next, at the time point tb1, the user presses the switch 200, causing the detection signal DET to decrease to the ground signal, and the power switching signal PWR_SW to change from low-level to high-level at the time point tb2. Due to the delay effect of the logic unit 110, the status signal ST_3 changes from high-level to low-level at the time point tb3; the status signal ST_1 changes from high-level to low-level at a time point tb4; finally, the status signal ST_2 changes from low level to high level at a time point tb5. Therefore, when the power control device 10 switches from on to off, only the first status latch unit 300 is in operation at the beginning. From the time points tb3 to tb5, however, operation gradually switches to the second status latch unit 302 only.

Therefore, as can be seen from the above, when the user switches the power supply status via the power control device 10, the status latch module 108 switches the power switching signal PWR_SW according to a previous operation status (i.e. a previous operation status corresponding to the status signals ST_1-ST_3), and the logic unit 110 adjusts the status signals ST_1-ST_3 via two inverting operations and a delay operation. In such a case, additional microcontrollers are not required to record the previous operation status. Additionally, since the power control device 10 is composed of common electronic components, production costs can be effectively reduced. Furthermore, the power control device 10 consumes minimal standby power, thus fulfilling energy conserving requirements.

On the other hand, the aforementioned embodiment serves to illustrate the concept of the invention, and any variations made accordingly are within the scope of the invention. For example, selection of the resistors R1-R9 and the capacitors C1-C3 need not meet any specific requirements, providing that relationships between the status signals ST_1-ST_3 are ensured to conform to the aforementioned conditions, and that the transistors Q1-Q5 can operate normally. Furthermore, in the aforementioned descriptions, the transistors Q1-Q5 are n-type metal oxide semiconductor (N-MOS) transistors, and the transistor Q6 is a p-type metal oxide semiconductor (P-MOS) transistor, but this is not limited thereto, and any component or device capable of implementing the same functionalities may be utilized to replace the transistors Q1-Q6. Similarly, the diodes D1, D2 are primarily for ensuring a forward bias conduction, and may be omitted or substituted by other components of similar functionalities, and are not limited herein.

As mentioned above, the power control device 10 may be used for various electronic devices, such as household appliances, information equipments, meters and instruments, etc. The load 100 is not limited to be a circuit device for performing functionalities of the electronic device, but can also be another control device. In other words, the DC power source VOUT outputted by the power control device 10 to the load 100 may be a control signal or command, for controlling certain functionalities of the electronic device. Moreover, if the power control device 10 is utilized in an electronic device which includes other control components or devices, and requires active power supply control under certain circumstances, then it is possible to add a power-off/power-on control unit to the electronic device to further allow force control of the power control device 10.

Figure 7A:
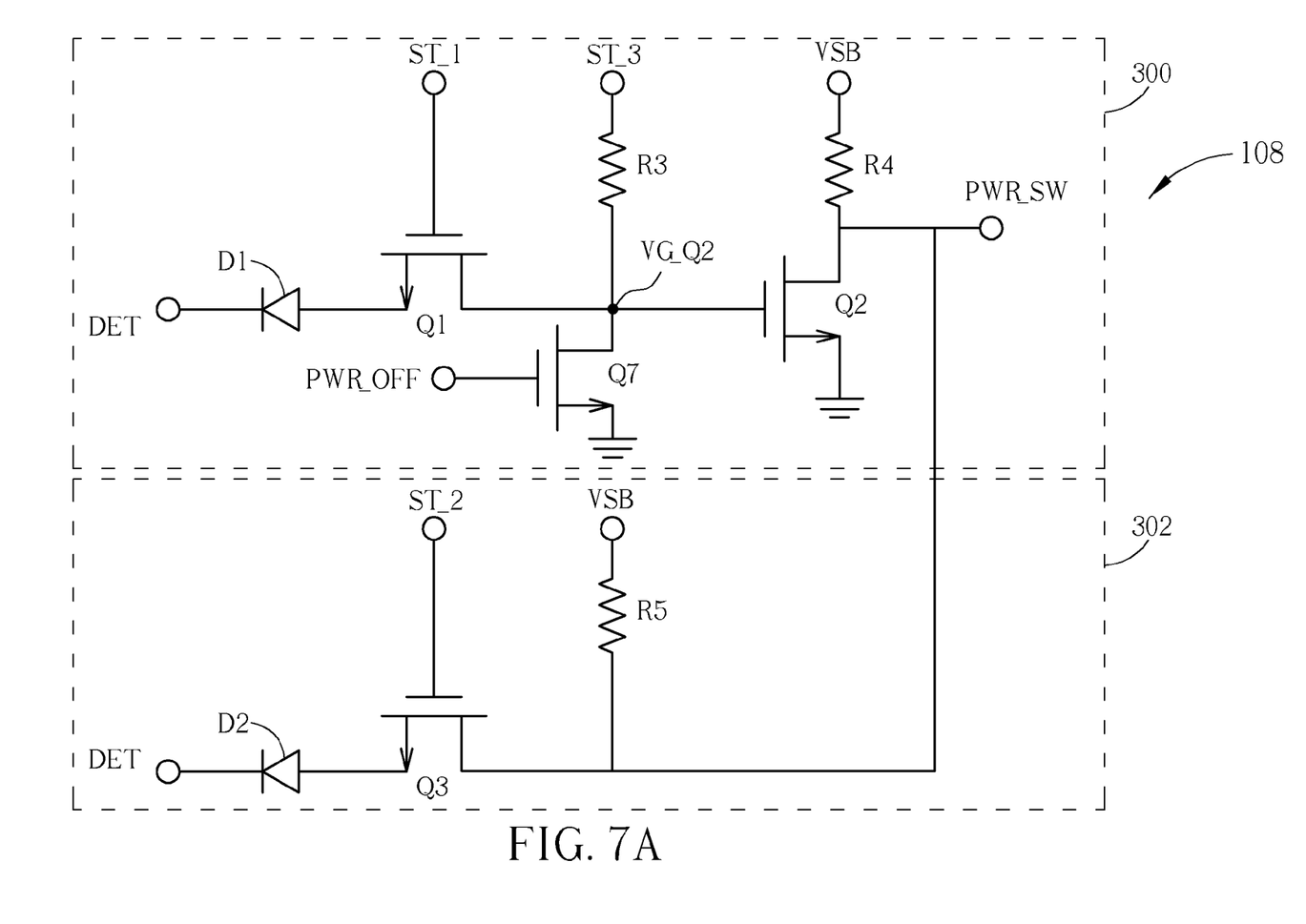
FIG. 7A is a schematic diagram of the status latch module shown in FIG. 3 with an additional power-off control unit.

For example, as shown in FIG. 7A, it is possible to further connect a transistor Q7 to the gate of the transistor Q2 shown in FIG. 3 as the power-off control unit. The transistor Q7 controls the connection between the gate of the transistor Q2 and the ground according to an external power-off control signal PWR_OFF. When the power-off control signal PWR_OFF is at high-level, the transistor Q7 is conducted, such that the transistor Q2 is cut off, causing the power switching signal PWR_SW to be kept at high-level, and the power control device 10 to be maintained in the power-off status.

Figure 7B:
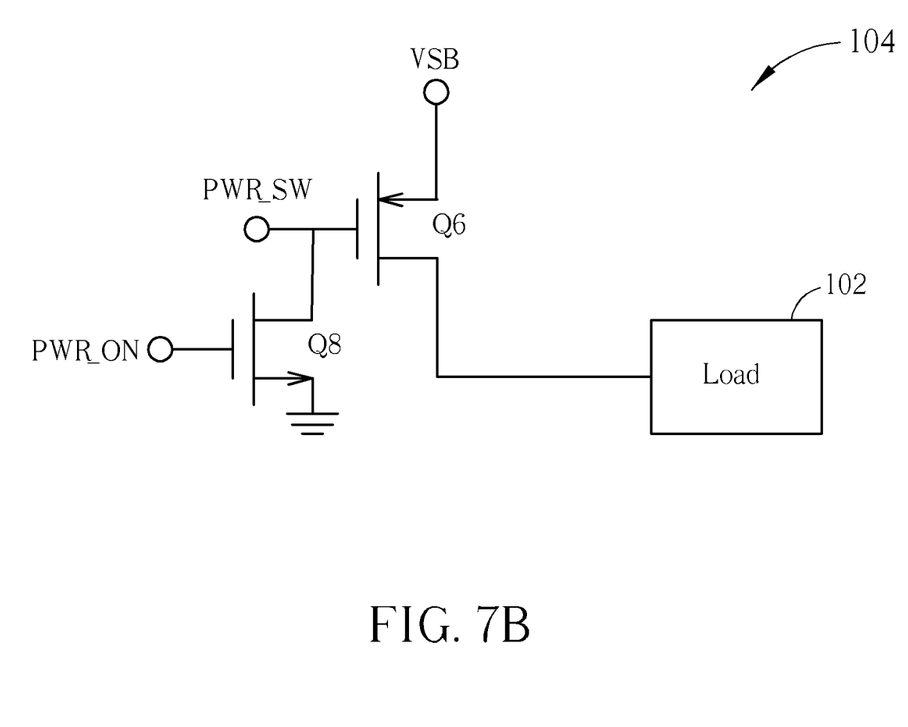
FIG. 7B is a schematic diagram of the power switching unit shown in FIG. 5 with an additional power-on control unit.

Similarly, as shown in FIG. 7B, it is possible to further connect a transistor Q8 to the gate of the transistor Q6 shown in FIG. 5 as the power-on control unit. The transistor Q8 controls the connection between the gate of the transistor Q6 and the ground according to an external power-on control signal PWR_ON. When the power-on control signal PWR_ON is at high-level, the transistor Q8 is conducted, causing the power switching signal PWR_SW to be kept at low-level, and the power control device 10 to be maintained in the power-on status.

In the prior art, electronic products consume a certain standby power even when switched off. Comparatively, the power control device of the invention utilizes status latching to effectively reduce the standby power consumption, and is cost-effective due to through an implementation using low-cost components.

In summary, the invention is capable of effectively reducing standby power consumption in electronic products, thereby fulfilling energy conserving purposes and conforming to related energy regulations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power control device for an electronic device, comprising:
   a power switching unit, for switching to output a direct current (DC) power source to a load of the electronic device according to a power switching signal;
   a switching detection unit, for responding to a power switching status to generate a switching detection signal;
   a status latch module, for generating the power switching signal according to the switching detection signal, a first status signal and a second status signal, comprising:
      a first status latch unit, comprising:
         a signal output end, for outputting the power switching signal;
         a signal receiving end, for receiving a third status signal;
         a first transistor, comprising:
            a first end, for receiving the first status signal;
            a second end, coupled to the switching detection unit to receive the switching detection signal; and
            a third end, coupled to the signal receiving end, for conducting a signal connection from the third end to the second end according to a signal level of the first end; and
         a second transistor, comprising:
            a first end, coupled to the third end of the first transistor and the signal receiving end;
            a second end, coupled to a ground; and
            a third end, coupled to the signal output end and the DC power source, for conducting a signal connection from the third end to the second end according to a signal level of the first end; and
      a second status latch unit, comprising:
         a third transistor, comprising:
            a first end, for receiving the second status signal;
            a second end, coupled to the switching detection unit to receive the switching detection signal; and
            a third end, coupled to the signal output end and the DC power source, for conducting a signal connection from the third end to the second end according to a signal level of the first end; and
      a logic unit, for generating the first status signal and the second status signal for the status latch module according to the power switching signal, such that the status latch module latches the first status signal and the second status signal;
   wherein the first status signal and the second status signal are used to control the first status latch unit or the second status latch unit to adjust the power switching signal according to the switching detection signal.

2. The power control device of claim 1, wherein all of the first transistor, the second transistor and the third transistor are n-type metal oxide semiconductor (N-MOS) transistors, and the first end, the second end, and the third end of each of the first transistor, the second transistor, and the third transistor are a gate, a source, and a drain, respectively.

3. The power control device of claim 1, wherein the first status latch unit further comprises a first diode, coupled between the second end of the first transistor and the switching detection unit, and the second status latch unit further comprises a second diode, coupled between the second end of the third transistor and the switching detection unit.

4. The power control device of claim 1 further comprising:
   a first resistor, coupled between the DC power source and the third end of the second transistor and the signal output end; and
   a second resistor, coupled between the DC power source and the third end of the third transistor and the signal output end.

5. The power control device of claim 1, wherein the first status signal and the second status signal are mutually inverted, and a generation time of the second status signal is later than a generation time of the first status signal, the generation time of the first status signal is later than a generation time of the switching detection signal, and a generation time of the third status signal is later than the generation time of the switching detection signal but earlier than the generation time of the first status signal, and the third status signal and the power switching signal are mutually inverted.

6. The power control device of claim 1, wherein the switching detection unit comprises a switch, and the switching detection signal is a ground signal of a low level when the switch is enabled, and the switching detection signal is a voltage signal of a high level when the switch is not enabled.

7. The power control device of claim 1, wherein the logic unit comprises:
   a first inverting unit, for generating the third status signal inverse to the power switching signal according to the power switching signal;
   a first delay unit, coupled to the first inverting unit, for producing a delay of a first preset time in the third status signal to generate the first status signal;
   a second delay unit, coupled to the first inverting unit, for producing a delay of a second preset time in the third status signal to generate a delay signal; and
   a second inverting unit, coupled to the second delay unit, for generating the second status signal inverse to the delay signal according to the delay signal;
   wherein the first preset time is longer than the second preset time.

8. The power control device of claim 7, wherein the first inverting unit is an n-type metal oxide semiconductor (N-MOS) transistor, having a gate coupled to the signal output end to receive the power switching signal, a drain coupled to the DC power source, the signal receiving end, the first delay unit, and the second delay unit, and a source coupled to the ground.

9. The power control device of claim 7, wherein the second inverting unit is an n-type metal oxide semiconductor (N-MOS) transistor having a gate coupled to the second delay unit to receive the delay signal, a drain coupled to the DC power source and the first end of the third transistor to output the second status signal, and a source coupled to the ground.

10. The power control device of claim 1, wherein the power switching unit is a p-type metal oxide semiconductor (P-MOS) transistor, having a gate coupled to the signal output end to receive the power switching signal, a drain coupled to the load, and a source coupled to the DC power source.

11. The power control device of claim 1 further comprising a power-off control unit, coupled to a control chip of the electronic device, for controlling the status latch module to generate the power switching signal for powering off the electronic device according to a power-off command of the control chip.

12. The power control device of claim 1 further comprising a power-on control unit, coupled to a control chip of the electronic device, for generating the power switching signal for powering on the electronic device for the power switching unit according to a power-on command of the control chip.

13. An electronic device, comprising:
a load;
a power supply, for outputting a direct current (DC) power source; and
a power control device, comprising:
  a power switching unit, for switching to output the DC power source to the load according to a power switching signal;
  a switching detection unit, for responding to a power switching status to generate a switching detection signal;
  a status latch module, for generating the power switching signal according to the switching detection signal, a first status signal and a second status signal, comprising:
    a first status latch unit, comprising:
      a signal output end, for outputting the power switching signal;
      a signal receiving end, for receiving a third status signal;
      a first transistor, comprising:
        a first end, for receiving the first status signal;
        a second end, coupled to the switching detection unit to receive the switching detection signal; and
        a third end, coupled to the signal receiving end, for conducting a signal connection from the third end to the second end according to a signal level of the first end; and
      a second transistor, comprising:
        a first end, coupled to the third end of the first transistor and the signal receiving end;
        a second end, coupled to a ground; and
        a third end, coupled to the signal output end and the DC power source, for conducting a signal connection from the third end to the second end according to a signal level of the first end; and
    a second status latch unit, comprising:
      a third transistor, comprising:
        a first end, for receiving the second status signal;
        a second end, coupled to the switching detection unit to receive the switching detection signal; and
        a third end, coupled to the signal output end and the DC power source, for conducting a signal connection from the third end to the second end according to a signal level of the first end; and
    a logic unit, for generating the first status signal and the second status signal for the status latch module according to the power switching signal, such that the status latch module latches the first status signal and the second status signal;
  wherein the first status signal and the second status signal are used to control the first status latch unit or the second status latch unit to adjust the power switching signal according to the switching detection signal.

14. The electronic device of claim 13, wherein all of the first transistor, the second transistor and the third transistor are n-type metal oxide semiconductor (N-MOS) transistors, and the first end, the second end, and the third end of each of the first transistor, the second transistor, and the third transistor are a gate, a source, and a drain, respectively.

15. The electronic device of claim 13, wherein the first status latch unit further comprises a first diode, coupled between the second end of the first transistor and the switching detection unit, and the second status latch unit further comprises a second diode, coupled between the second end of the third transistor and the switching detection unit.

16. The electronic device of claim 13 further comprising:
a first resistor, coupled between the DC power source and the third end of the second transistor and the signal output end; and
a second resistor, coupled between the DC power source and the third end of the third transistor and the signal output end.

17. The electronic device of claim 13, wherein the first status signal and the second status signal are mutually inverted, and a generation time of the second status signal is later than a generation time of the first status signal, the generation time of the first status signal is later than a generation time of the switching detection signal, and a generation time of the third status signal is later than the generation time of the switching detection signal but earlier than the generation time of the first status signal, and the third status signal and the power switching signal are mutually inverted.

18. The electronic device of claim 13, wherein the switching detection unit comprises a switch, and the switching detection signal is a ground signal of a low level when the switch is enabled, and the switching detection signal is a voltage signal of a high level when the switch is not enabled.

19. The electronic device of claim 13, wherein the logic unit comprises:
a first inverting unit, for generating the third status signal inverse to the power switching signal according to the power switching signal;
a first delay unit, coupled to the first inverting unit, for producing a delay of a first preset time in the third status signal to generate the first status signal;
a second delay unit, coupled to the first inverting unit, for producing a delay of a second preset time in the third status signal to generate a delay signal; and
a second inverting unit, coupled to the second delay unit, for generating the second status signal inverse to the delay signal according to the delay signal;
wherein the first preset time is longer than the second preset time.

20. The electronic device of claim 19, wherein the first inverting unit is an n-type metal oxide semiconductor (N-MOS) transistor, having a gate coupled to the signal output end to receive the power switching signal, a drain coupled to the DC power source, the signal receiving end, the first delay unit, and the second delay unit, and a source coupled to the ground.

21. The electronic device of claim 19, wherein the second inverting unit is an n-type metal oxide semiconductor (N-MOS) transistor having a gate coupled to the second delay unit to receive the delay signal, a drain coupled to the DC power source and the first end of the third transistor to output the second status signal, and a source coupled to the ground.

22. The electronic device of claim 13, wherein the power switching unit is a p-type metal oxide semiconductor (P-MOS) transistor, having a gate coupled to the signal output end to receive the power switching signal, a drain coupled to the load, and a source coupled to the DC power source.

23. The electronic device of claim 13 further comprising a power-off control unit, coupled to a control chip of the electronic device, for controlling the status latch module to generate the power switching signal for powering off the electronic device according to a power-off command of the control chip.

24. The electronic device of claim 13 further comprising a power-on control unit, coupled to a control chip of the electronic device, for generating the power switching signal for powering on the electronic device for the power switching unit according to a power-on command of the control chip.

* * * * *